US011789822B1

(12) United States Patent
Dubeyko et al.

(10) Patent No.: US 11,789,822 B1
(45) Date of Patent: Oct. 17, 2023

(54) IMPLEMENTATION OF FAST AND RELIABLE METADATA OPERATIONS

(71) Applicants: Lemon Inc., Grand Cayman (KY); BEIJING YOUZHUJU NETWORK TECHNOLOGY CO. LTD., Beijing (CN)

(72) Inventors: Viacheslav Dubeyko, Los Angeles, CA (US); Jian Wang, Beijing (CN)

(73) Assignees: LEMON INC., Grand Cayman (KY); BEIJING YOUZHUJU NETWORK TECHNOLOGY CO. LTD., Beijing (CN)

( * ) Notice: Subject to any disclaimer, the term of this patent is extended or adjusted under 35 U.S.C. 154(b) by 0 days.

(21) Appl. No.: 17/814,414

(22) Filed: Jul. 22, 2022

(51) Int. Cl.
*G06F 11/14* (2006.01)
*G06F 3/06* (2006.01)

(52) U.S. Cl.
CPC .......... *G06F 11/1435* (2013.01); *G06F 3/061* (2013.01); *G06F 3/0631* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 9,467,460 B1* | 10/2016 | Otvagin | .................. | G06F 16/13 |
| 2017/0316047 A1* | 11/2017 | Dubeyko | .............. | G06F 3/0619 |
| 2018/0307426 A1* | 10/2018 | Sakai | ..................... | G06F 3/0689 |
| 2021/0133037 A1* | 5/2021 | Behera | ................ | G06F 11/1464 |
| 2021/0326271 A1* | 10/2021 | Sasson | ................ | G06F 3/0652 |
| 2022/0129444 A1* | 4/2022 | Chien | ................ | G06F 13/4027 |
| 2022/0179559 A1* | 6/2022 | Ihara | ..................... | G06F 3/0619 |
| 2022/0206715 A1* | 6/2022 | Kim | ..................... | G06F 3/0656 |

* cited by examiner

*Primary Examiner* — Charles Rones
*Assistant Examiner* — Jonah C Krieger
(74) *Attorney, Agent, or Firm* — BakerHostetler (57) ABSTRACT

The present disclosure describes techniques for implementing fast and reliable metadata operations. A metadata area instance may be created in a persistent memory associated with a host. The metadata area instance may comprise a first portion configured to store an initial state of metadata, a second portion configured to store an actual state of the metadata, and a third portion configured to store a plurality of modifications to the metadata. A main copy of the metadata may be generated by performing write operations in the metadata area instance. The main copy of the metadata may be updated based on receiving information indicative of a modification to the metadata.

20 Claims, 10 Drawing Sheets

IMPLEMENTATION OF FAST AND RELIABLE METADATA OPERATIONS

BACKGROUND

Companies and/or individuals, increasingly need to process a large quantity of data and/or metadata. However, the large quantity of available data and/or metadata may make it difficult for the companies and/or individuals to efficiently process the data and/or metadata. For example, implementing metadata operations may be unreliable and/or slow. Improved techniques for implementing metadata operations are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Zoned namespace (ZNS) solid-state drive (SSD) is a new technology that can expose a zoned block storage interface between the host (e.g., application) and the SSD. However, ZNS SSD creates challenges for existing file systems. For example, ZNS SSD may restrict the write input/output (I/O) by append-only mode. Append-only is a property of computer data storage such that new data can be appended to the storage. The append-only mode of write operations may restrict the file system from rewriting any sector multiple times. The append-only manner of write I/O requests may create the side effect of decreasing performance of read I/O requests. A host must open a zone, write sequentially within that zone, close the zone, and erase the zone to rewrite it again. The SSD may manage a write pointer for every opened zone and the host may write only into the write pointer's LBA. Any write operations before or after the write pointer may result in an I/O request error. However, many existing file systems expect the capability to write or rewrite any LBA at any time. Additionally, ZNS SSD can support only a limited number of open or active zones.

Journaling may be used to issue write I/O requests in a ZNS-friendly manner. Many file systems employ journaling as a reliability technique. A journal may act as a circular buffer that works in append-only mode, which is the mode that the ZNS SSD is expecting. Thus, journaling can be used as a main write technique for multiple file systems. If journaling is used as a main write technique, a file system may need to write journal transactions but may skip journal replay until read I/O request(s) are received. In certain embodiments, the journal can be replayed by the storage device itself in the background if, for example, the journal has received enough transactions to exhaust the whole zone. As such, generally speaking, journaling may provide a way to store data in append-only mode that is ZNS compatible and flash-friendly.

However, the journal has to be replayed if user data or metadata needs to be read from the volume. Journal replay may introduce additional overhead for the read I/O case. For example, to read a piece of data (e.g., 4 KB of data), multiple journal transactions (e.g., several MB of journal transactions) may need to be read and the journal may need to be replayed. Thus, the replay journal operation may cause degradation of read I/O performance, and such read I/O degradation can negatively affect the total performance of the file system.

Offloading journal replay into a storage device may solve such read I/O performance degradation if the storage device has computational power. Multiple field-programmable gate array (FPGA) or application-specific integrated circuit (ASIC) cores of computational storage device can execute journal replay for every read I/O request. Such hardware logic can replay journal(s) in the background to prepare an actual state of user data and metadata, such as before a read I/O request is issued. Journal replay may be executed by the storage device on a regular basis if a zone is exhausted or is filled up to some threshold. As hardware assisted journal replay can be executed in a massively parallel manner, this approach may be used to execute write I/O requests in a zone-aware and zone-friendly manner (append-only mode), and/or to guarantee stable and high performance of read I/O requests with high reliability of file system operations.

However, not every storage device includes FPGA, ASIC, or RISC-V cores that can execute journal replay. Additionally, journal replay offload may not be able to significantly improve performance and reliability of metadata operations because the file system may still need to flush modified metadata from the DRAM on the host side into the storage device. Thus, improvements for implementing metadata operations are needed, so that metadata operations may be implemented in a faster and more reliable manner.

Described herein are improved techniques of implementing fast and reliable metadata operations. The techniques described herein utilize a replicated metadata model, that may be used instead of, or in addition to, offloading journal replay into a storage device. As described herein, a host can include a persistent and byte-addressable memory (e.g., Optane memory) that keeps or stores a main copy of metadata. As used herein, persistent storage or memory refers to any data storage device that retains data after power to that device is shut off. It is also sometimes referred to as non-volatile storage. The file system driver on the host-side can use this fast persistent memory to access and/or modify metadata. This approach may guarantee high performance of metadata operations, as the persistent memory on the host-side can be accessed at near dynamic random-access memory (DRAM) speed (e.g., the same as or slightly lower than DRAM speed).

The file system driver may prepare a journal transaction for every metadata modification, and these transactions may be stored in the ZNS SSD to guarantee high reliability of metadata operations. The main copy of metadata in the fast persistent memory on the host-side guarantees high performance of metadata operations, while the journal transactions stored in the ZNS SSD guarantee high reliability of metadata and also provide a way to recover a metadata state if the main copy of metadata becomes corrupted.

Figure 1:
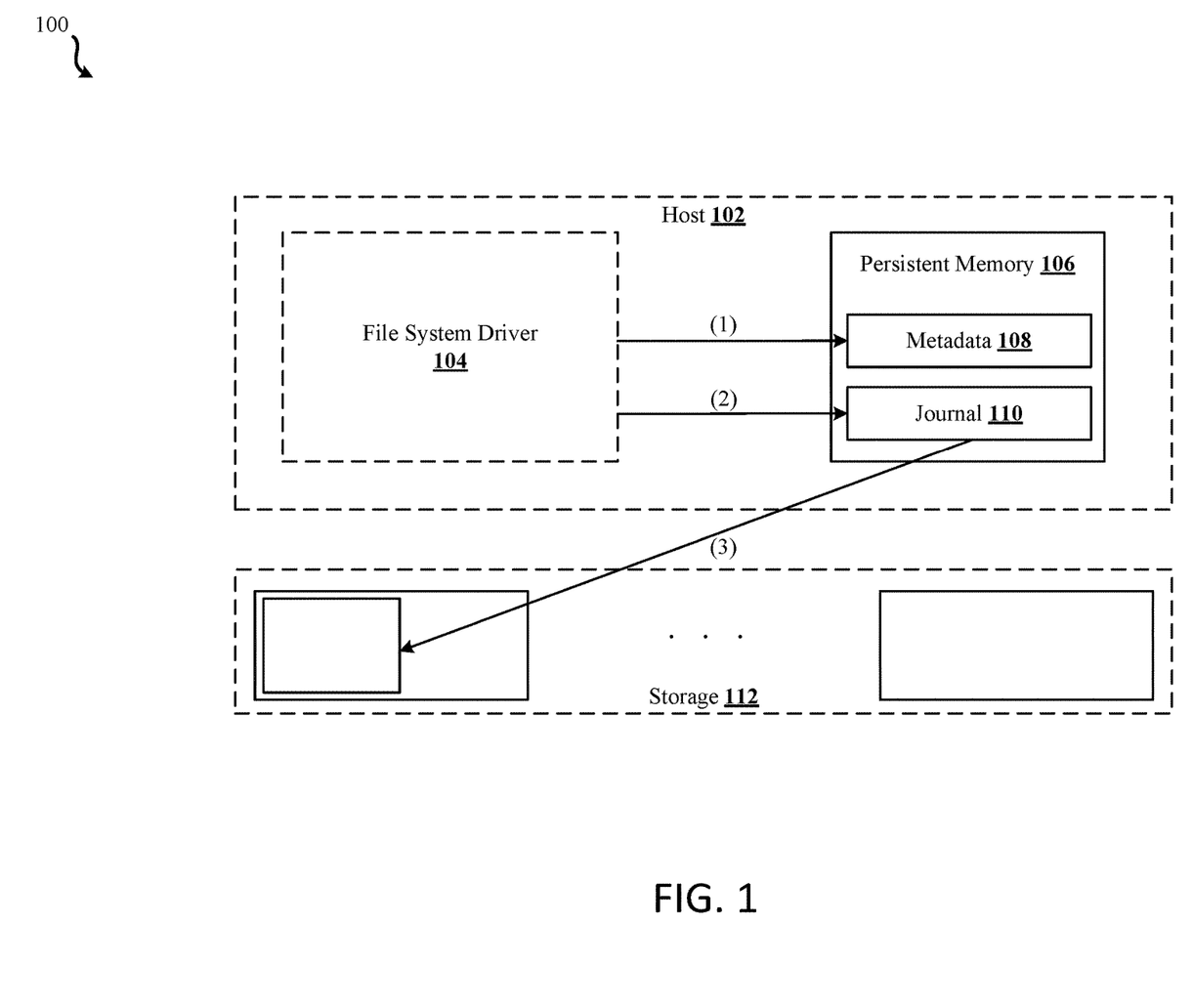
FIG. 1 illustrates an exemplary system for implementing metadata operations in accordance with the present disclosure.

FIG. 1 illustrates an exemplary framework 100 for implementing fast and reliable metadata operations in accordance with the present disclosure. The framework 100 includes a host 102 and a storage device 112. The storage device 112 may be ZNS SSD, conventional SSD, or SMR HDD (Shingled Magnetic Recording Hard Disk Drive). As used herein, SSD may refer to ZNS SSD or conventional SSD. The host 102 may be a computing device. The host 102 may, for example, comprise an application. The host 102 may include a file system driver 104 (e.g., software that lives in DRAM) and a fast persistent memory 106.

In embodiments, the persistent memory 106 includes a metadata area configured to store metadata 108. The metadata area may comprise a first portion configured to store an initial state of metadata, a second portion configured to store an actual state of the metadata, and a third portion configured to store a plurality of modifications to the metadata (collectively, a "main copy" of metadata). The journal 110 can store metadata as well as user data modifications in the form of transactions. The persistent memory 106 may be used to prepare journal transactions on the host side. Then, the journal 110 may be flushed from the persistent memory 106 into the storage device 112. The main copy of the metadata may be created by the file system driver 104 by performing write operations in the metadata area. As shown at numeral 1 of FIG. 1, if the metadata is modified, the file system driver 104 may update the main copy of the metadata accordingly. For example, the file system driver 104 may update main copy of the metadata based on receiving information indicative of a modification to the metadata.

In the example of FIG. 1, at numeral 2, the file system driver 104 may store journal transactions associated with the modifications to the metadata. Such journal transactions may be stored in the persistent memory 106, such as in the journal 110. Updating the main copy of the metadata in the persistent memory 106 may take place as a part of regular file system driver operations. Flush logic of the file system driver 104 may gather all dirty metadata and prepare the journal transactions that are stored into the journal 110 with the goal to enhance the reliability of metadata operations. As shown at numeral 3, a background thread or the flush logic of the file system driver 104 may periodically flush journal transactions stored in the persistent memory 106 into the storage device 112 based on one or more predetermined rules. For example, the file system driver 104 may flush journal transactions stored in the persistent memory 106 into the storage device 112 based on the file system driver 104 determining that a quantity of the journal transactions stored in the persistent memory 106 satisfies a predetermined threshold.

Figure 2:
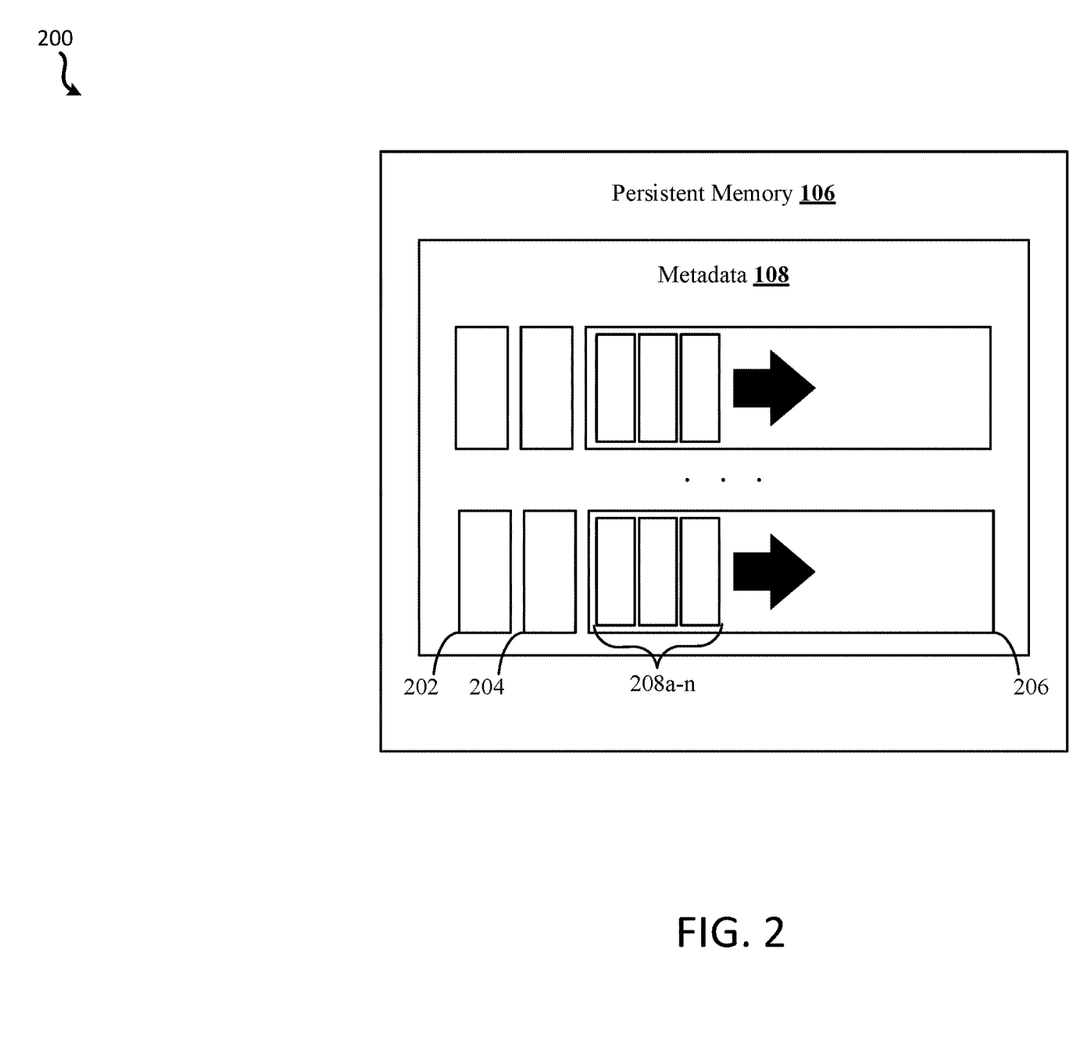
FIG. 2 illustrates an exemplary diagram depicting a metadata structure in a persistent memory in accordance with the present disclosure.

FIG. 2 illustrates an exemplary metadata structure 200 depicting the metadata area in the persistent memory 106 in accordance with the present disclosure. The structure of the metadata 108 stored in the metadata area may, for example, be represented by an array, a b-tree, or any other suitable structure. The metadata structure may be split into portions of fixed size (e.g., 4K-8K), Thus, metadata modification can happen on a 4K (8K etc.) basis.

Each metadata portion can be stored as aggregation of an initial state 202, an actual state 204, and a dedicated journal 206 with deltas (e.g., changes, modifications) 208a-n to the metadata. The initial state 202 may be stored, such as by the file system driver 104, during the metadata initialization step and it may be used with the delta 208a-n to get the actual state 204. The initial state 202 may be rewritten in the case of journal exhaustion. The actual state 204 may receive all metadata modifications and it may store the last actual state of the metadata portion. In some embodiments, the metadata portion may not include an actual state, as it is possible to determine actual state by applying the deltas to the initial state.

As described above with regard to FIG. 1, the main copy of the metadata may be created by the file system driver 104 by performing write operations in the metadata area (i.e., on metadata area instance basis). In certain embodiments, to create the main copy of the metadata, the file system driver 104 may first determine if the metadata area instance is empty. If the file system driver 104 determines that the metadata area instance is empty, the file system driver 104 may store an initial state 202 of the metadata in a first portion of the metadata area.

Conversely, if the file system driver 104 determines that the metadata area instance is not empty, the file system driver 104 may then determine whether the dedicated journal 206 with deltas (e.g., changes, modifications) 208a-n is full. If the file system driver 104 determines that the dedicated journal 206 with deltas (e.g., changes, modifications) 208a-n is full, the file system driver 104 may rewrite an initial state and then clear or clean the dedicated journal. If something going wrong with the rewrite operation, the journal can be used to recover the initial state by means of replaying journal transactions. Conversely, if the file system driver 104 determines that the dedicated journal 206 with deltas (e.g., changes, modifications) 208a-n is not full, the file system driver 104 may add a journal transaction with a delta to the initial state to the dedicated journal 206 and store an actual state 204 of the metadata in a second portion of the metadata area instance.

Figure 3:
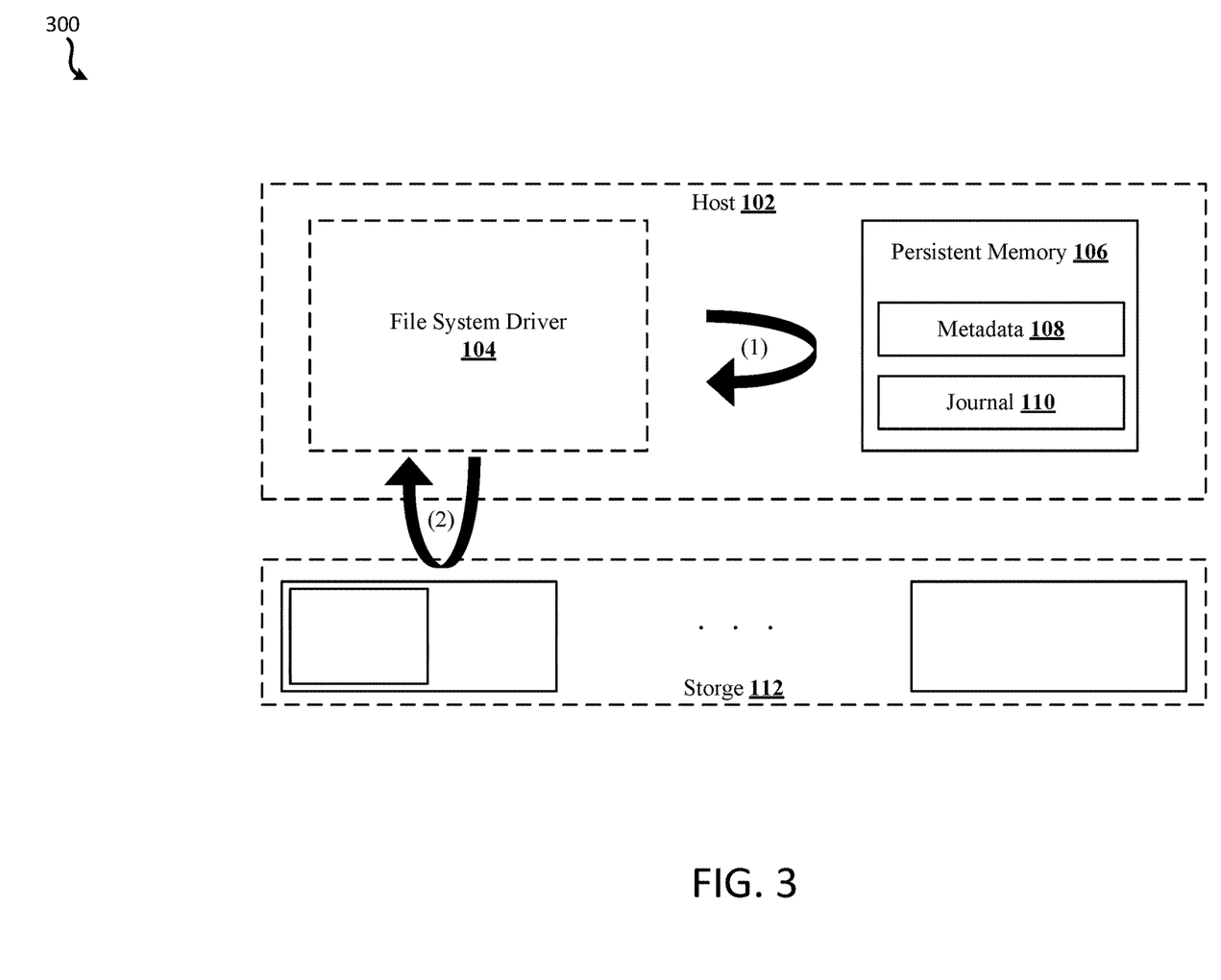
FIG. 3 illustrates an exemplary framework for implementing metadata operations in accordance with the present disclosure.

FIG. 3 illustrates an exemplary framework 300 for implementing fast and reliable metadata operations in accordance with the present disclosure. The persistent memory 106 on the host 102 side guarantees fast read/write/modify operations with metadata. As shown at numeral 1, the file system driver 104 on the host 102 side can quickly access and/or modify metadata 108 stored in the metadata area. The storage device 112 may store journal transactions with metadata modifications as a second (and slower) source of snapshots. These snapshots may provide one way to recover the metadata state in the case of metadata corruption.

In the case of metadata corruption, when a file system driver tries to access the actual state, but the actual state of the metadata is corrupted, then the file system driver may use the initial state and journal transactions stored in the persistent memory to recover the consistent metadata state.

If applying every journal transaction on the initial state results in corrupted metadata, then the file system driver may need to use the snapshots stored in the storage device (e.g., the storage device 112) to recover the metadata.

There are two replicas of metadata (e.g., one in persistent memory 106 and another one in the storage device 112). In case that the persistent memory 106 is corrupted, the storage device 112 can be used to recover metadata. As shown at numeral 2, the file system driver 104 may recover corrupted metadata from the storage device 112. Oppositely, if the storage device 112 has corrupted journal transactions, then the persistent memory 106 may be used to store a corrected metadata state into the storage device 112.

Figure 4:
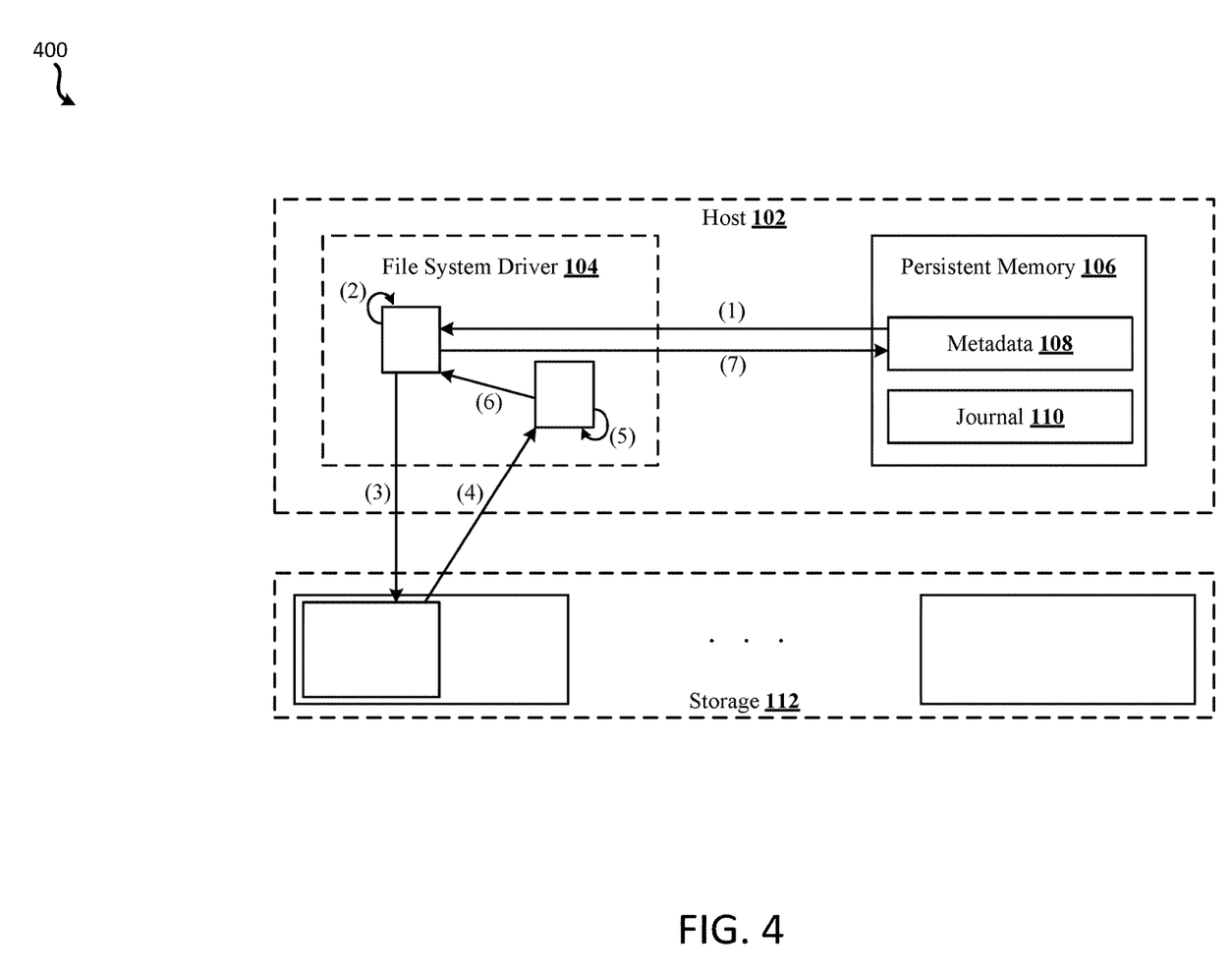
FIG. 4 illustrates an exemplary framework for implementing metadata operations in accordance with the present disclosure.

FIG. 4 illustrates an exemplary framework 400 for recovering corrupted metadata in accordance with the present disclosure. At numeral 1, the file system driver 104 may read, write, and/or modify metadata stored in the metadata area 108. At numeral 2, the file system driver 104 may discover metadata corruption while accessing and/or modifying the metadata stored in the metadata area 108. If the file system driver 104 discovers metadata corruption while accessing and/or modifying the metadata 108 stored in the metadata area, at numeral 3, the file system driver 104 may request journal content from the storage device 112. At numeral 4, the file system driver 104 may receive the journal content. At numeral 5, the file system driver may replay the journal to recover the consistent metadata state. At numeral 6, the file system driver 104 may recover the consistent metadata state. At numeral 7, the file system driver 104 may save the corrected metadata state in the metadata area.

In certain embodiments, instead of the file system driver 104 requesting journal content from the storage device 112, receiving the journal content, and replaying the journal to recover the consistent metadata state, the journal may instead be replayed by the storage device 112. For example, the storage device 112 may comprise one or more FPGA cores, one or more ASIC cores, and/or one or more RISC-V cores. The journal may be replayed by the one or more FPGA cores or one or more ASIC cores of the storage device 112. As such, journal replay may be offloaded to the storage device 112. The file system driver 104 can read particular LBA(s) that contain the consistent state of corrupted metadata. The storage device 112 can replay the journal internally and return content of requested LBA(s) to the file system driver 104. The file system driver 104 may save the corrected metadata state in the metadata area.

The journal replay operation has simple logic that can be easily implemented by the one or more FPGA cores or one or more ASIC cores in the storage device 112. As a result, the replay operation may be performed by the storage device 112 rather than the host. The host does not need to waste CPU resources on the replay operation.

The journal replay operation can be used as execution of offloaded computation. It can provide a powerful ecosystem for application developers to integrate the computational power of computational storage into the programming paradigm to achieve significant improvement of data processing performance. For example, an extended Berkeley packet filter (eBPF) mechanism may provide an easy-to-use programming paradigm to develop and to offload computation logic into storage space, Thus, computation logic may be delivered into the storage device 112 in a cheaper and faster manner. The capability to offload data processing into the storage device 112 (containing computational power in the form of FPGA or ASIC core(s)) by means of eBPF provides the way to improve data processing approach with easy and flexible programming technique.

Another possible way to deliver some function or executable code into the storage device 112 can be as an extended attribute of a file and/or folder. Extended file attributes are file system features that enable users to associate computer files with metadata not interpreted by the file system, whereas regular attributes have a purpose strictly defined by the file system (such as permissions or records of creation and modification times).

Figure 5:
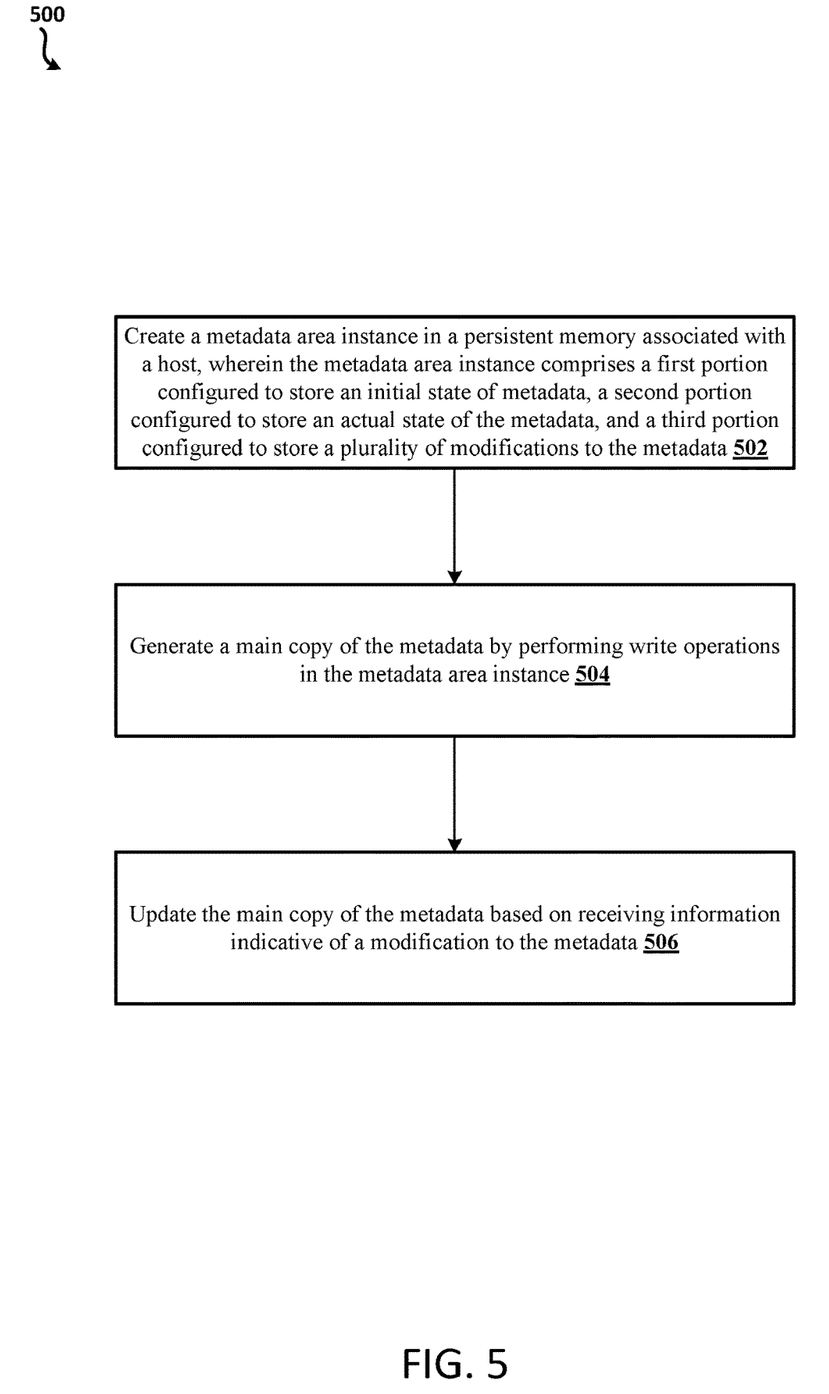
FIG. 5 illustrates an example process for implementing metadata operations in accordance with the present disclosure.

FIG. 5 illustrates an example process 500. The process 500 may be performed, at least in part, by one or more components of the framework 100. The process 500 may be performed to implement fast and reliable metadata operations using the metadata structure 200 as shown in FIG. 2. Although depicted as a sequence of operations in FIG. 5, those of ordinary skill in the art will appreciate that various embodiments may add, remove, reorder, or modify the depicted operations.

As described above, a host (e.g., host 102) may include a persistent memory (e.g., persistent memory 106). The persistent memory may include a metadata area or set of metadata areas for storing metadata structures in the form of arrays, bitmaps, b-trees and so on. At 502, a metadata area instance may be created in a persistent memory (e.g., the persistent memory 106) associated with a host (e.g., the host 102). The metadata area instance may comprise a first portion configured to store an initial state of metadata, a second portion configured to store an actual state of the metadata, and a third portion configured to store a plurality of modifications to the metadata.

A main copy of the metadata may be created by a file system driver (e.g., the file system driver 104) by performing write operations in the metadata area. At 504, a main copy of the metadata may be generated by performing write operations in the metadata area. If the metadata is later modified, the file system driver may update the main copy of the metadata accordingly. At 506, the main copy of the metadata may be updated based on receiving information indicative of a modification to the metadata. The persistent memory on the host side guarantees fast read/write operations with metadata. For example, the file system driver on the host side can quickly access and/or modify metadata stored in the metadata area.

Figure 6:
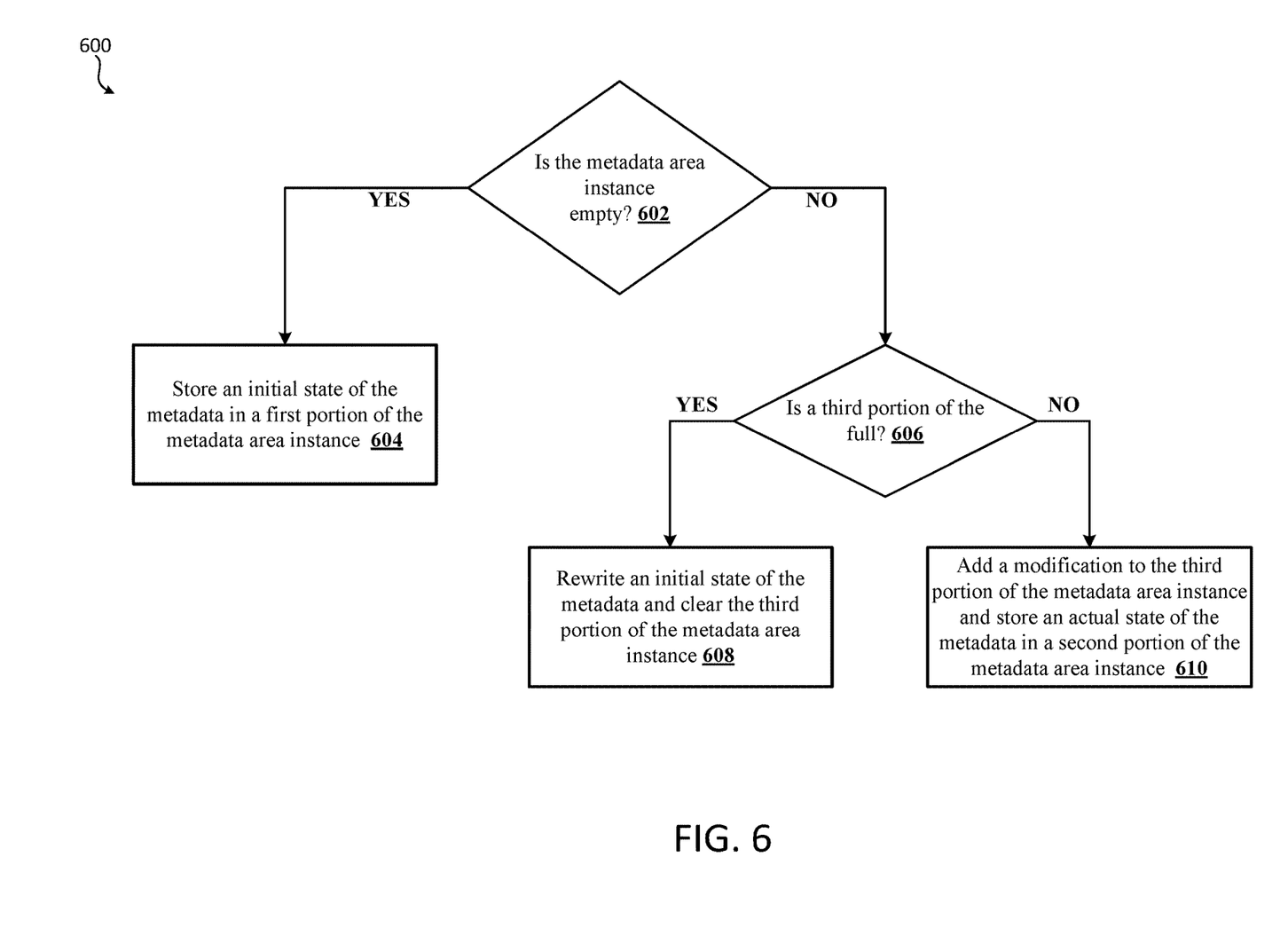
FIG. 6 illustrates another example process for implementing metadata operations in accordance with the present disclosure.

FIG. 6 illustrates an example process 600. The process 600 may be performed, at least in part, by one or more components of the framework 100. The process 600 may be performed to implement fast and reliable metadata operations using the metadata structure 200 as shown in FIG. 2. Although depicted as a sequence of operations in FIG. 6, those of ordinary skill in the art will appreciate that various embodiments may add, remove, reorder, or modify the depicted operations.

As described above, a main copy of metadata may be created by a file system driver (e.g., file system driver 104) by performing write operations in a metadata area in a persistent memory (e.g., persistent memory 106) of a host (e.g., the host 102). To create the main copy of the metadata, the file system driver may first determine if the metadata area instance is empty. At 602, it may be determined, such as by the file system driver, if the metadata area instance is empty. If it is determined that the metadata area instance is empty, the process 600 may process to 604. At 604, an initial state of the metadata may be stored in a first portion of the metadata area instance. The process 600 may terminate after 604.

Conversely, if it is determined that the metadata area instance is not empty, the process 600 may proceed to 606. At 606, it may be determined if a third portion of the metadata area instance is full. For example, it may be determined whether the dedicated journal with deltas (e.g., changes, modifications) to the metadata is full. If it is determined that the third portion of the metadata area instance is full, the process 600 may proceed to 608. At 608, an initial state of the metadata may be rewritten and then the third portion of the metadata area instance may be cleared. The process 600 may terminate after 608.

Conversely, if it is determined that the third portion of the metadata area instance is not full, the process 600 may proceed to 610. At 610, a modification to the metadata may be added to the third portion of the metadata area instance and an actual state of the metadata may be stored in a second portion of the metadata area instance. The process 600 may terminate after 610.

Figure 7:
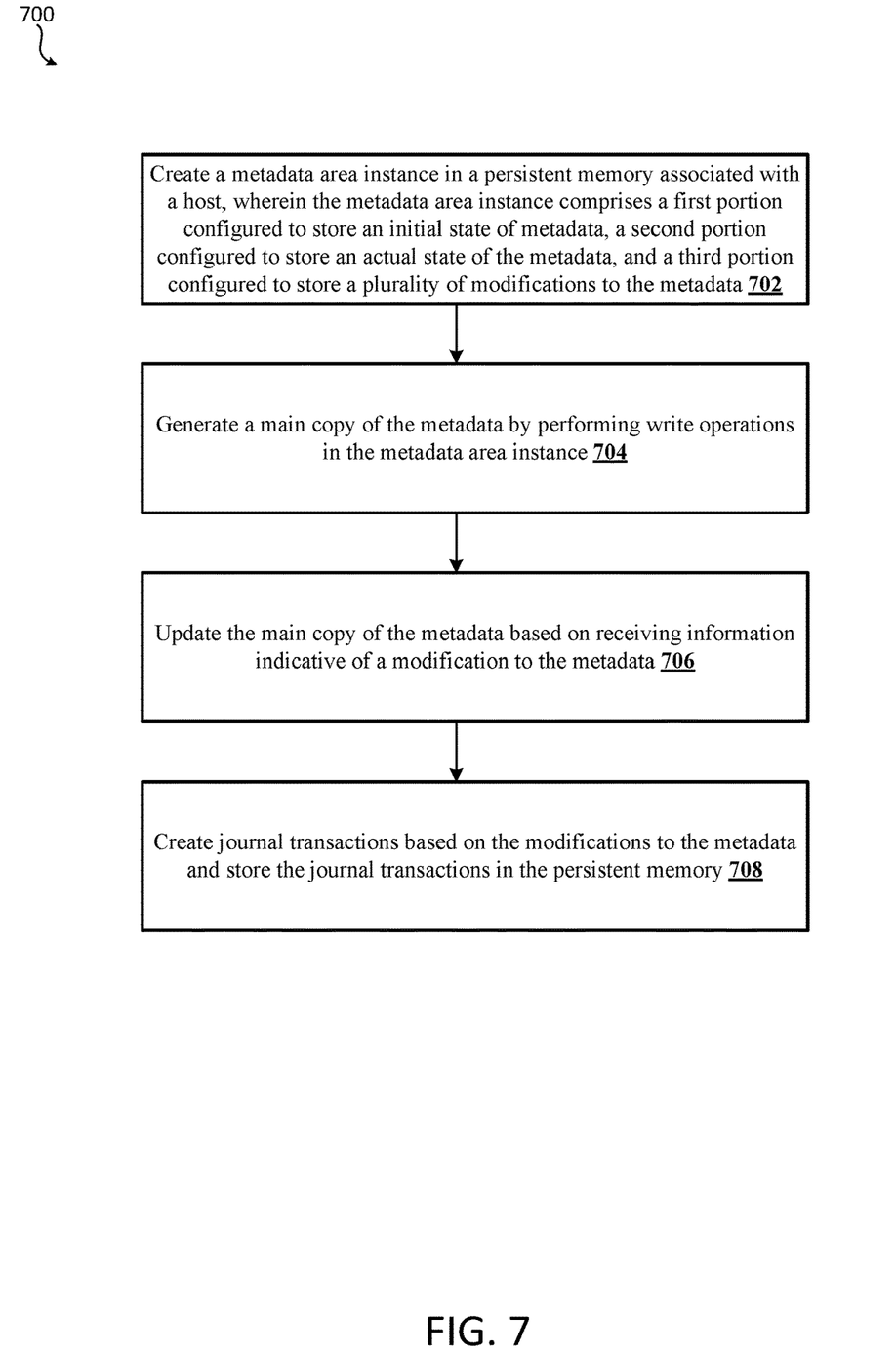
FIG. 7 illustrates another example process for implementing metadata operations in accordance with the present disclosure.

FIG. 7 illustrates an example process 700. The process 700 may be performed, at least in part, by one or more components of the framework 100. The process 700 may be performed to implement fast and reliable metadata operations using the metadata structure as shown in FIG. 2. Although depicted as a sequence of operations in FIG. 7, those of ordinary skill in the art will appreciate that various embodiments may add, remove, reorder, or modify the depicted operations.

As described above, a host (e.g., host 102) may include a persistent memory (e.g., persistent memory 106). The persistent memory may include a metadata area or sets of metadata areas configured to store metadata (e.g., metadata 108). At 702, the metadata area instance may be created in a persistent memory (e.g., persistent memory 106) associated with a host (e.g., host 102). The metadata area instance may comprise a first portion configured to store an initial state of metadata, a second portion configured to store an actual state of the metadata, and a third portion configured to store a plurality of modifications to the metadata.

A main copy of the metadata may be created by a (e.g., file system driver 104) by performing write operations in the metadata area instance. At 704, a main copy of the metadata may be generated by performing write operations in the metadata area instance. If the metadata is later modified, the file system driver may update the main copy of the metadata accordingly. At 706, the main copy of the metadata may be updated based on receiving information indicative of a modification to the metadata. The metadata area(s) in the persistent memory on the host side guarantees fast read/write operations with metadata. For example, the file system driver on the host side can quickly access and/or modify metadata stored in the metadata area.

A storage device (e.g., the storage device 112) may store journal transactions with metadata modifications as a second (and slower) source of snapshots. These snapshots may provide one way to recover the metadata state in the case of metadata corruption. When a file system driver tries to access the actual state of metadata, but the actual state of the metadata is corrupted, then the file system driver may use the initial state and journal transactions stored in the persistent memory to recover the consistent metadata state. If applying every journal transaction on the initial state results in corrupted metadata, then the file system driver may need to use the snapshots stored in the storage device (e.g., the storage device 112) to recover the metadata.

At 708, journal transactions may be created based on modifications to metadata and the journal transactions may be stored in a persistent memory associated with a host. The file system driver's flush logic may gather all dirty metadata and prepare the journal transactions that are stored into the journal with the goal to enhance the reliability of metadata operations. In some examples, the persistent memory may be used to prepare journal transactions on the host side. The journal in the persistent memory can store metadata and user data in the form of transactions. When a file system driver tries to access the actual state, but the actual state of the metadata is corrupted, then the file system driver may use the initial state and journal transactions stored in the persistent memory to recover the consistent metadata state.

In some embodiments, a background thread or flush logic of the file system driver may periodically flush journal transactions stored in the persistent memory into a storage device (e.g., storage 112) based on one or more predetermined rules. The journal transactions may be flushed into the storage device based on a predetermined rule. In some examples, the journal transactions may be periodically flushed from the persistent memory into the storage device. In other examples, the journal transactions stored in the persistent memory may be flushed into the storage device based on determining that a quantity of the journal transactions stored in the persistent memory satisfies a predetermined threshold.

Figure 8:
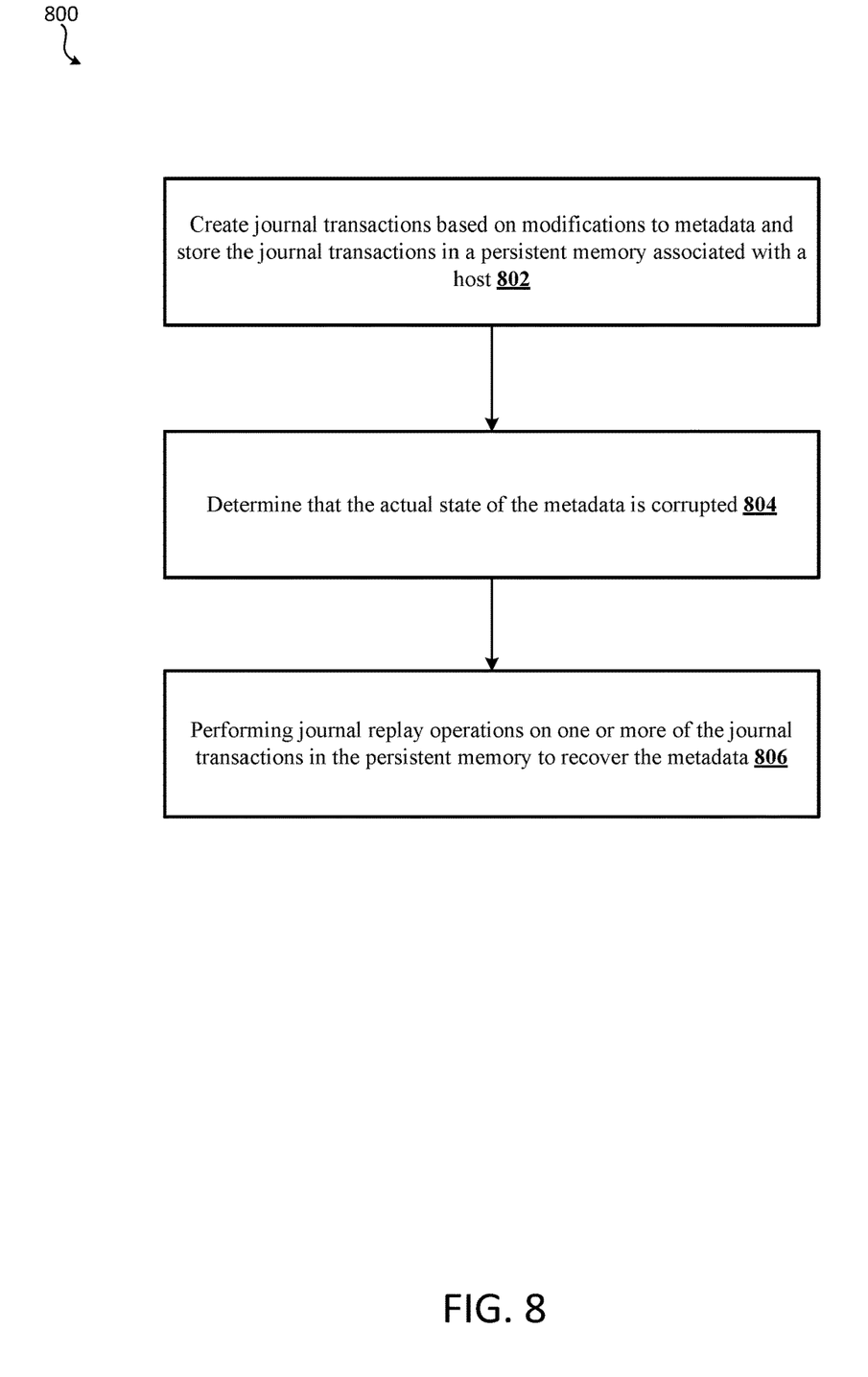
FIG. 8 illustrates another example process for implementing metadata operations in accordance with the present disclosure.

FIG. 8 illustrates an example process 800. The process 800 may be performed, at least in part, by one or more components of the framework 100. The process 800 may be performed to implement fast and reliable metadata operations using the metadata structure as shown FIG. 2. Although depicted as a sequence of operations in FIG. 8, those of ordinary skill in the art will appreciate that various embodiments may add, remove, reorder, or modify the depicted operations.

As described above, a host (e.g., host 102) may include a persistent memory (e.g., persistent memory 106). The persistent memory may include a metadata area configured to store metadata (e.g., metadata 108). The metadata area may comprise a first portion configured to store an initial state of metadata, a second portion configured to store an actual state of the metadata, and a third portion configured to store a plurality of modifications to the metadata. A main copy of the metadata may be created by a (e.g., file system driver 104) by performing write operations in the metadata area. If the metadata is later modified, the main copy of the metadata may be updated accordingly. The metadata area in the persistent memory on the host side guarantees fast read/write operations with metadata. For example, the file system driver on the host side can quickly access and/or modify metadata stored in the metadata area.

A storage device (e.g., the storage device 112) may store journal transactions with metadata modifications as a second (and slower) source of snapshots. These snapshots may provide one way to recover the metadata state in the case of metadata corruption. There are two replicas of metadata (e.g., one in persistent memory and another in the storage device). In case that the persistent memory is corrupted, the storage device can be used to recover metadata and the file system driver may recover corrupted metadata from the storage device. Oppositely, if the storage device has corrupted journal transactions, then the persistent memory may be used to store a corrected metadata state into the storage device.

At 802, journal transactions may be created based on modifications to metadata and the journal transactions may be stored in a persistent memory associated with a host. The journal in the persistent memory can store metadata as well as user data in the form of transactions. In some examples, the persistent memory may be used to prepare journal transactions on the host side. When a file system driver tries to access an actual state of the metadata, the actual state of the metadata may be corrupted. At 804, it may be determined that the actual state of the metadata is corrupted. The metadata corruption may be determined during a read operation, a write operation, or a modify operation by a file system driver.

The file system driver may use the initial state and journal transactions stored in the persistent memory to recover the consistent metadata state when the actual state of the metadata is corrupted. At 806, journal replay operations may be performed on one or more of the journal transactions stored in the persistent memory to recover the metadata. If applying every journal transaction on the initial state results in corrupted metadata, then the file system driver may need to use the snapshots stored in the storage device (e.g., the storage device 112) to recover the metadata.

Figure 9:
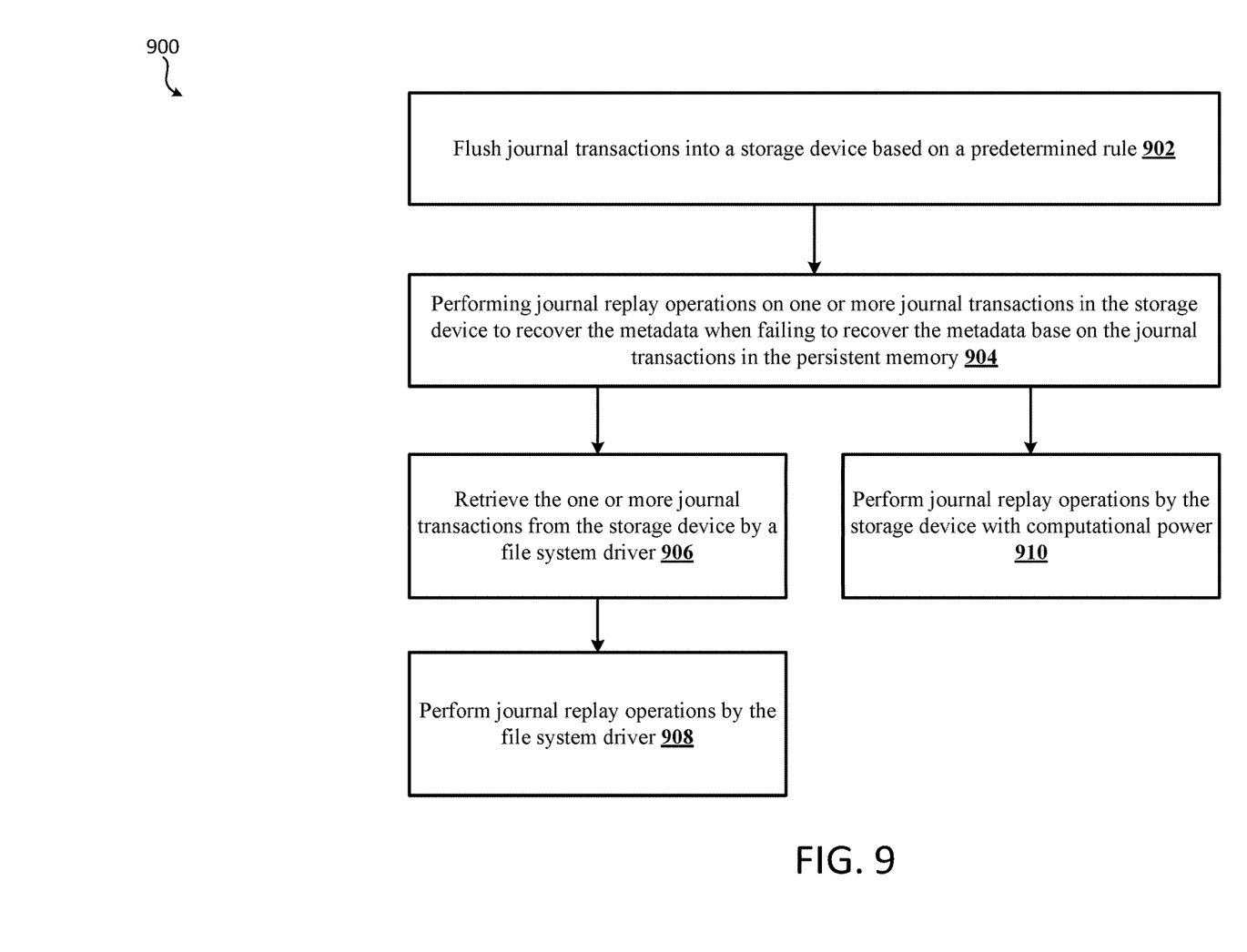
FIG. 9 illustrates another example process for implementing metadata operations in accordance with the present disclosure.

FIG. 9 illustrates an example process 900. The process 900 may be performed, at least in part, by one or more components of the framework 100. The process 900 may be performed to implement fast and reliable metadata operations. Although depicted as a sequence of operations in FIG. 9, those of ordinary skill in the art will appreciate that various embodiments may add, remove, reorder, or modify the depicted operations.

At 902, journal transactions may be flushed into a storage device (e.g., storage 112) based on one or more predetermined rules. A background thread or flush logic of a file system driver (e.g., the file system driver 104) may flush journal transactions from the persistent memory into the storage device (e.g., zone of ZNS SSD) based on one or more predetermined rules. The journal transactions may be flushed into a storage device (e.g., ZNS SSD) based on predetermined rules. In some examples, the journal transactions may be periodically flushed into the storage device. In other examples, the journal transactions may be flushed into the storage device based on determining that a quantity of the journal transactions in the persistent memory satisfies a predetermined threshold.

A file system driver (e.g., the file system driver 104) may discover metadata corruption while accessing and/or modifying the metadata stored in the metadata area. If an actual state of the metadata is corrupted when the file system driver tries to access the actual state of the metadata, the file system driver may use the initial state and journal transactions stored in the persistent memory to recover the consistent metadata state. If applying every journal transaction on the initial state results in corrupted metadata, then the file system driver may need to use the journal transactions stored in the storage device to recover the metadata. At 904, journal replay operations on one or more journal transactions in the storage device may be performed to recover the metadata when failing to recover the metadata base on the journal transactions in the persistent memory.

In some embodiments, the file system driver may request journal content from the storage device (e.g., storage 112). The process 900 may proceed to 906 or to 910. At 906, the one or more journal transactions may be retrieved from the storage device by the file system driver. The file system driver may replay the journal to recover the consistent metadata state. At 908, journal replay operations may be performed by the file system drive. The journal replay operations may recover the consistent metadata state. The file system driver may save the corrected metadata state in the metadata area(s).

In other embodiments, instead of the file system driver requesting journal content from the storage device, receiving the journal content, and replaying the journal to recover the consistent metadata state, the journal may instead be replayed by the storage device when the storage device has a computational power. As such, journal replay may be offloaded to the storage device. At 910, journal replay operations may be performed by at least one FPGA, ASIC or RISC-V core associated with the storage device having computational power. After the storage device performs the journal replay operations to recover the consistent metadata state, the storage device may inform the file system driver of the corrected metadata state. The file system driver may save the corrected metadata state in the metadata area(s).

Figure 10:
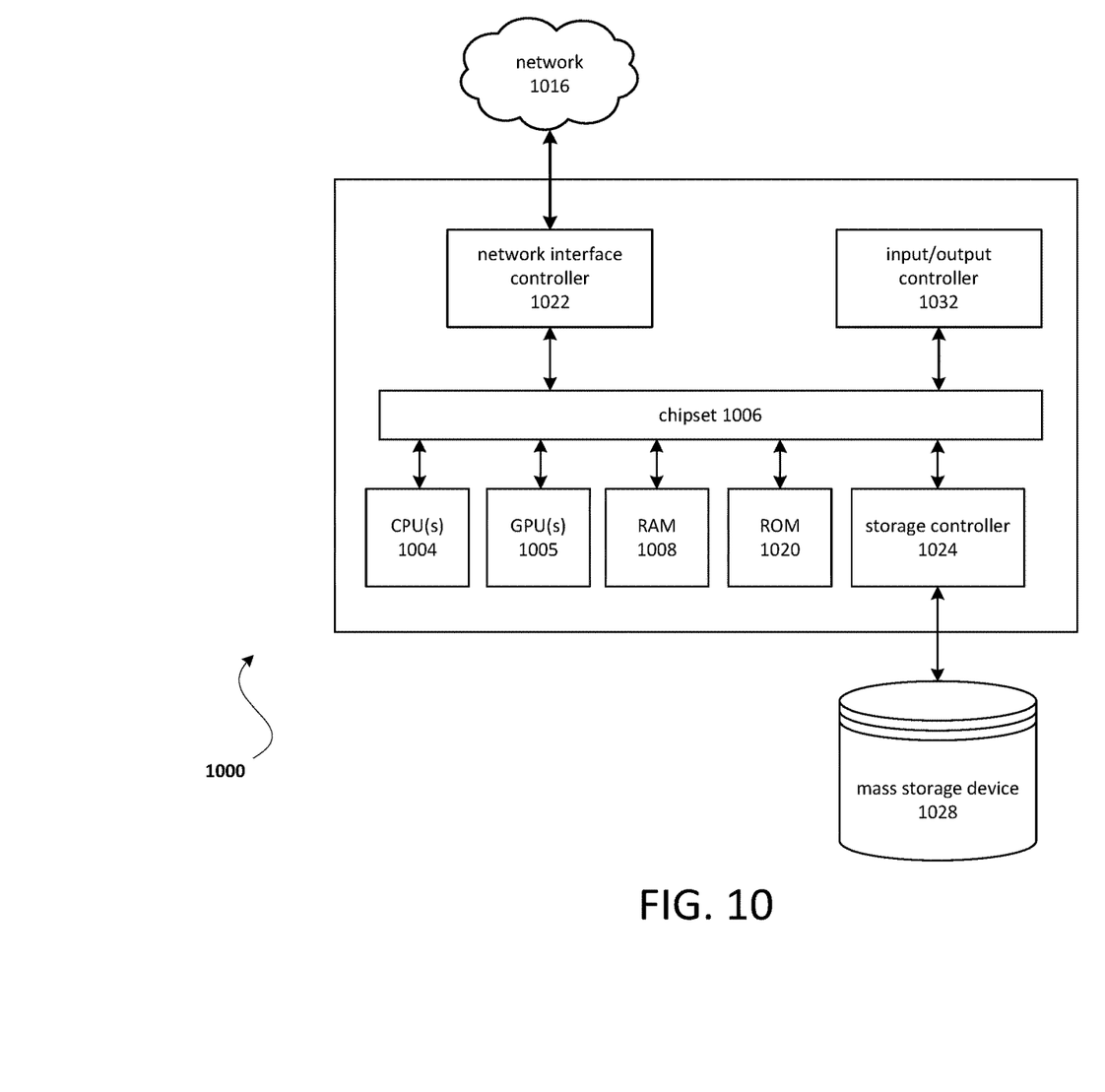
FIG. 10 illustrates an example computing device which may be used to perform any of the techniques disclosed herein.

FIG. 10 illustrates a computing device that may be used in various aspects, such as the services, networks, modules, and/or devices depicted in FIGS. 1-4. The computer architecture shown in FIG. 10 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1000 may include a baseboard, or "motherboard," which is a printed circuit board to which a multitude of components or devices may be connected by way of a system bus or other electrical communication paths. One or more central processing units (CPUs) 1004 may operate in conjunction with a chipset 1006. The CPU(s) 1004 may be standard programmable processors that perform arithmetic and logical operations necessary for the operation of the computing device 1000.

The CPU(s) 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s) 1005. The GPU(s) 1005 may comprise processing units specialized for but not necessarily limited to highly parallel computations, such as graphics and other visualization-related processing.

A chipset 1006 may provide an interface between the CPU(s) 1004 and the remainder of the components and devices on the baseboard. The chipset 1006 may provide an interface to a random-access memory (RAM) 1008 used as the main memory in the computing device 1000. The chipset 1006 may further provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems through local area network (LAN). The chipset 1006 may include functionality for providing network connectivity through a network interface controller (NIC) 1022, such as a gigabit Ethernet adapter. A NIC 1022 may be capable of connecting the computing device 1000 to other computing nodes over a network 1016.

It should be appreciated that multiple NICs 1022 may be present in the computing device 1000, connecting the computing device to other types of networks and remote computer systems.

The computing device 1000 may be connected to a mass storage device 1028 that provides non-volatile storage for the computer. The mass storage device 1028 may store system programs, application programs, other program modules, and data, which have been described in greater detail herein. The mass storage device 1028 may be connected to the computing device 1000 through a storage controller 1024 connected to the chipset 1006. The mass storage device 1028 may consist of one or more physical storage units. The mass storage device 1028 may comprise a management component 1010. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on the mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1028 is characterized as primary or secondary storage and the like.

For example, the computing device 1000 may store information to the mass storage device 1028 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 1028 by detecting the physical states or characteristics of one or more particular locations within the physical storage units.

In addition to the mass storage device 1028 described above, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1028 may store other system or application programs and data utilized by the computing device 1000.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described above. The computing device 1000 may have access to computer-readable storage media storing computer-executable instructions, which, when executed by the computing device 1000, may perform the methods described herein.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate.

For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc.

Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of implementing fast and reliable metadata operations, the method comprising:
   creating a metadata area instance in a persistent memory associated with a host comprising a file system driver, wherein the metadata area instance is configured to store metadata, wherein the metadata area instance comprises a first portion configured to store an initial state of the metadata, a second portion configured to store an actual state of the metadata, and a third portion configured to store a plurality of modifications to the metadata, and wherein the metadata area instance in the persistent memory enables fast metadata operations by the file system driver;
   generating a main copy of the metadata by a file system driver performing write operations in the metadata area instance;
   updating the main copy of the metadata by the file system driver based on receiving information indicative of a modification to the metadata; and
   preparing and storing journal transactions associated with the modification by the file system driver to enhance a reliability of metadata operations.

2. The method of claim 1, further comprising:
   creating journal transactions based on the modifications to the metadata; and
   storing the journal transactions in the persistent memory.

3. The method of claim 2, further comprising:
   determining that the actual state of the metadata is corrupted; and
   performing journal replay operations on one or more of the journal transactions in the persistent memory to recover the metadata.

4. The method of claim 2, further comprising:
   flushing the journal transactions into a storage device based on a predetermined rule.

5. The method of claim 4, further comprising:
   performing journal replay operations on one or more journal transactions in the storage device to recover the metadata when failing to recover the metadata base on the journal transactions in the persistent memory.

6. The method of claim 5, further comprising:
   retrieving the one or more journal transactions from the storage device by a file system driver; and
   performing the journal replay operations by the file system driver.

7. The method of claim 5, further comprising:
   performing the journal replay operations by the storage device, wherein the storage device has a computational power.

8. The method of claim 1, further comprising:
   determining that the metadata area instance is empty; and
   storing the initial state of the metadata in the first portion of the metadata area instance.

9. The method of claim 1, further comprising:
   determining whether the third portion of the metadata area instance is full in response to determining that the metadata area instance is not empty; and
   in response to determining that the third portion of the metadata area instance is full, rewriting the initial state of the metadata and cleaning the third portion of the metadata area instance.

10. The method of claim 1, further comprising:
    determining whether the third portion of the metadata area instance is full in response to determining that the metadata area instance is not empty; and
    adding the modification to the third portion of the metadata area and storing the actual state of the metadata in the second portion of the metadata area in response to determining that the third portion of the metadata area instance is not full.

11. A system comprising:
    at least one processor; and
    at least one memory comprising computer-readable instructions that upon execution by the at least one processor cause the system to perform operations comprising:
    creating a metadata area instance in a persistent memory associated with a host comprising a file system driver, wherein the metadata area instance is configured to store metadata, wherein the metadata area instance comprises a first portion configured to store an initial state of the metadata, a second portion configured to store an actual state of the metadata, and a third portion configured to store a plurality of modifications to the metadata, and wherein the metadata area instance in the persistent memory enables fast metadata operations by the file system driver;
    generating a main copy of the metadata by a file system driver performing write operations in the metadata area instance; and
    updating the main copy of the metadata by a file system driver based on receiving information indicative of a modification to the metadata; and
    preparing and storing journal transactions associated with the modification by the file system driver to enhance a reliability of metadata operations.

12. The system of claim 11, the operations further comprising:
    creating journal transactions based on the modifications to the metadata; and
    storing the journal transactions in the persistent memory.

13. The system of claim 12, the operations further comprising:
    determining that the actual state of the metadata is corrupted; and
    performing journal replay operations on one or more of the journal transactions in the persistent memory to recover the metadata.

14. The system of claim 11, the operations further comprising:
    determining that the metadata area instance is empty; and storing the initial state of the metadata in the first portion of the metadata area instance.

15. The system of claim 11, the operations further comprising:
   determining whether the third portion of the metadata area instance is full in response to determining that the metadata area instance is not empty; and
   rewriting the initial state of the metadata and cleaning the third portion of the metadata area in response to determining that the third portion of the metadata area instance is full, or adding the modification to the third portion of the metadata area instance and storing the actual state of the metadata in the second portion of the metadata area instance in response to determining that the third portion of the metadata area instance is not full.

16. The system of claim 12, the operations further comprising:
   flushing the journal transactions into a storage device based on a predetermined rule; and
   performing journal replay operations on one or more journal transactions in the storage device to recover the metadata when failing to recover the metadata base on the journal transactions in the persistent memory.

17. A non-transitory computer-readable storage medium, storing computer-readable instructions that upon execution by a processor cause the processor to implement operations, the operation comprising:
   creating a metadata area instance in a persistent memory associated with a host comprising a file system driver, wherein the metadata area instance is configured to store metadata, wherein the metadata area instance comprises a first portion configured to store an initial state of the metadata, a second portion configured to store an actual state of the metadata, and a third portion configured to store a plurality of modifications to the metadata, and wherein the metadata area instance in the persistent memory enables fast metadata operations by the file system driver;
   generating a main copy of the metadata by the file system driver performing write operations in the metadata area instance;
   updating the main copy of the metadata by the file system driver based on receiving information indicative of a modification to the metadata; and
   preparing and storing journal transactions associated with the modification by the file system driver to enhance a reliability of metadata operations.

18. The non-transitory computer-readable storage medium of claim 17, the operations further comprising:
   creating journal transactions based on the modifications to the metadata and storing the journal transactions in the persistent memory;
   determining that the actual state of the metadata is corrupted; and
   performing journal replay operations on one or more of the journal transactions in the persistent memory to recover the metadata.

19. The non-transitory computer-readable storage medium of claim 17, the operations further comprising:
   determining that the metadata area instance is empty; and
   storing the initial state of the metadata in the first portion of the metadata area instance.

20. The non-transitory computer-readable storage medium of claim 17, the operations further comprising:
   determining whether the third portion of the metadata area instance is full in response to determining that the metadata area instance is not empty; and
   rewriting the initial state of the metadata and cleaning the third portion of the metadata area in response to determining that the third portion of the metadata area instance is full, or adding the modification to the third portion of the metadata area instance and storing the actual state of the metadata in the second portion of the metadata area instance in response to determining that the third portion of the metadata area instance is not full.

* * * * *